US011936570B1

(12) United States Patent
Koren et al.

(10) Patent No.: US 11,936,570 B1
(45) Date of Patent: Mar. 19, 2024

(54) MODULAR SWITCH AND A METHOD FOR SCALING SWITCHES

(71) Applicant: XSIGHT LABS LTD., Kiryat Gat (IL)

(72) Inventors: Guy Koren, Rishon Lezion (IL); Gal Malach, Gedera (IL); Erez Shaizaf, Nir Chen (IL)

(73) Assignee: XSIGHT LABS LTD., Kiryat Gat (IL)

( * ) Notice: Subject to any disclaimer, the term of this patent is extended or adjusted under 35 U.S.C. 154(b) by 193 days.

(21) Appl. No.: 16/578,346

(22) Filed: Sep. 22, 2019

Related U.S. Application Data

(60) Provisional application No. 62/747,163, filed on Oct. 18, 2018, provisional application No. 62/747,172, filed on Oct. 18, 2018.

(51) Int. Cl.
*H04Q 1/00* (2006.01)
*H04L 47/22* (2022.01)
*H04L 47/625* (2022.01)
*H04L 47/6295* (2022.01)
*H04Q 11/00* (2006.01)

(52) U.S. Cl.
CPC ......... *H04L 47/6295* (2013.01); *H04L 47/22* (2013.01); *H04L 47/6255* (2013.01)

(58) Field of Classification Search
CPC . H04L 47/34; H04L 49/1523; H04L 49/1569; H04L 49/3072; H04L 49/30
See application file for complete search history.

(56) References Cited

U.S. PATENT DOCUMENTS

| | | | |
|---|---|---|---|
| 5,802,052 A * | 9/1998 | Venkataraman | H04L 12/5601 370/395.72 |
| 7,558,264 B1 * | 7/2009 | Lolayekar | G06F 11/2087 370/392 |
| 10,009,293 B1 * | 6/2018 | Mukherjee | H04L 45/74 |
| 10,164,906 B1 * | 12/2018 | Ramanujam | H04L 49/3072 |
| 2002/0049608 A1 * | 4/2002 | Hartsell | G06Q 10/10 709/226 |
| 2011/0075549 A1 * | 3/2011 | Lu | H04L 45/22 370/216 |
| 2016/0044695 A1 * | 2/2016 | Gunner | H04L 49/205 370/336 |
| 2018/0011735 A1 * | 1/2018 | Singer | G06F 9/3802 |

* cited by examiner

*Primary Examiner* — Melvin C Marcelo
*Assistant Examiner* — Natali Pascual Peguero
(74) *Attorney, Agent, or Firm* — Reches Patentss

(57) ABSTRACT

A modular switch and a method that includes (a) first tier switching elements that comprise input output (IO) ports; and (b) second tier switching elements that are coupled to the first tier switching elements in a non-blocking manner. The first tier switching elements are configured to perform traffic management of traffic, and perform substantially all egress processing and ingress processing of the traffic; wherein the traffic management comprises load balancing, traffic shaping and flow-based reordering. The second tier switching elements are configured to (a) provide a shared memory space to the first tier switching elements, (b) perform substantially all of the queuing of traffic and (c) send, to the first tier switching elements, status information related to the status of shared memory resources. The first tier switching elements are configured to perform the traffic management based, at least in part, on the status information.

15 Claims, 7 Drawing Sheets

| ARRIVED ? | X | Yes | Yes | x | Yes | Yes | Yes |
|---|---|---|---|---|---|---|---|
| Flow last SN | 110 | 108 | 113 | | 95 | 116 | 117 | 118 |
| Flow | 1 | 2 | 2 | 1 | 3 | 3 | 3 |
| Packet serial number | 112 | 113 | 114 | 115 | 116 | 117 | 118 |
| SN difference | 2 | 5 | 1 | 3 | 21 | 1 | 1 |
| Decision | | TX | TX | | TX | TX | TX |

FIG. 6

MODULAR SWITCH AND A METHOD FOR SCALING SWITCHES

CROSS-REFERENCE

This application claims priority from U.S. provisional patent 62/747,163 filing date Oct. 18, 2019 and from U.S. provisional patent 62/747,172 filing date Oct. 18, 2019, both being incorporated herein by reference.

BACKGROUND

The amount of traffic that passes through communication devices continues to grow and the tolerable processing and/or switching period continues to diminish. Data center traffic is experiencing exponential growth due to enterprises moving their infrastructure to the cloud, the emergence of AI services that analyze peta bytes of data and Video/VR services streaming at unprecedented quality.

There is a growing need to provide a system that will be able to cope with these demands.

SUMMARY

There may be provided a system, method and computer readable medium as illustrated in the specification and/or the claims and/or the drawings.

BRIEF DESCRIPTION OF THE DRAWINGS

In order to understand the invention and to see how it may be carried out in practice, a preferred embodiment will now be described, by way of non-limiting example only, with reference to the accompanying drawings.

FIG. 6 is an example of traffic shaping.

DETAILED DESCRIPTION OF THE DRAWINGS

Figure 1:
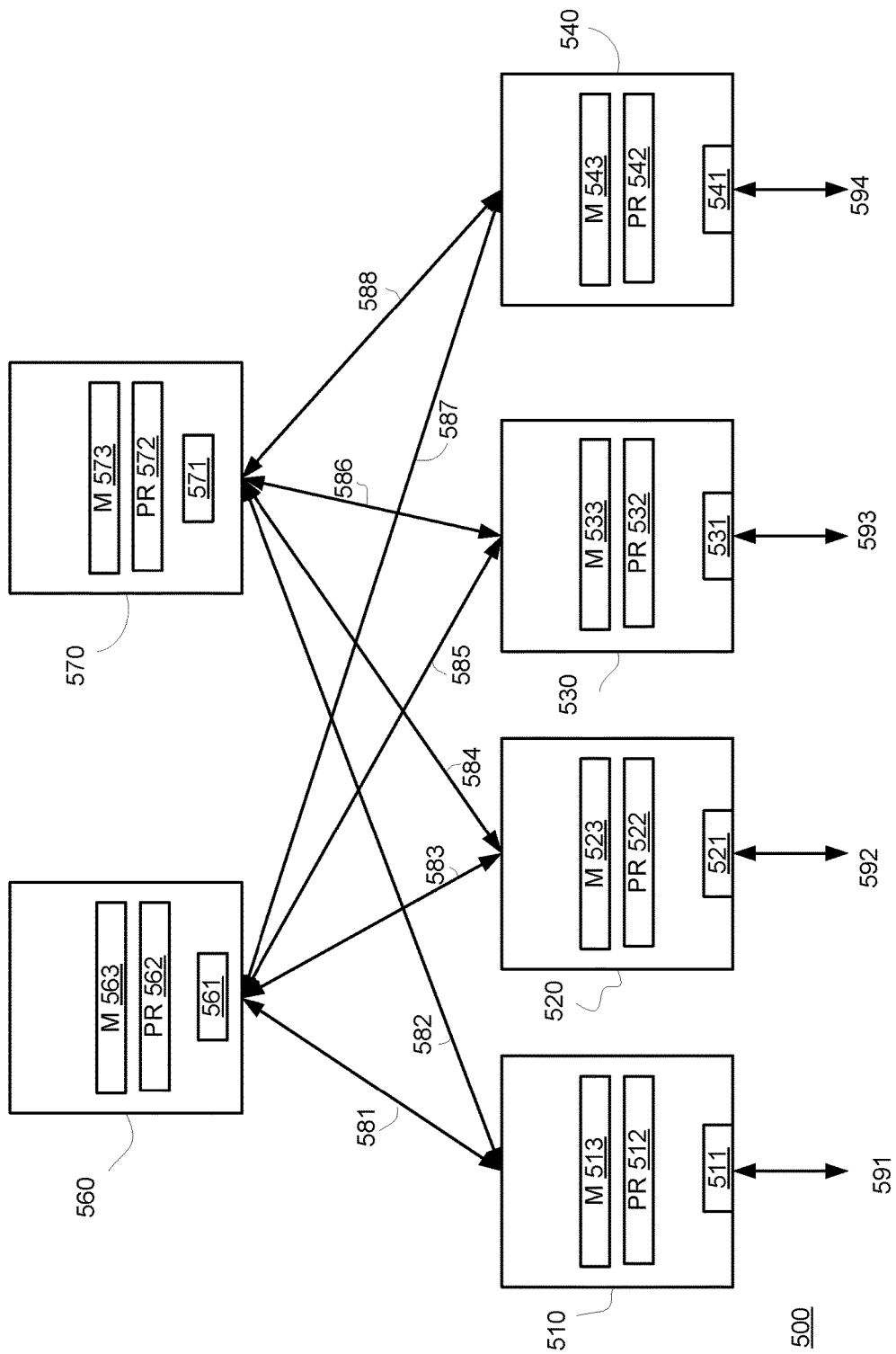
FIG. 1 is an example of a modular switch.

Any reference to a system should be applied, mutatis mutandis to a method that is executed by a system and/or to a non-transitory computer readable medium that stores instructions that once executed by the system will cause the system to execute the method.

Any reference to method should be applied, mutatis mutandis to a system that is configured to execute the method and/or to a non-transitory computer readable medium that stores instructions that once executed by the system will cause the system to execute the method.

Any reference to a non-transitory computer readable medium should be applied, mutatis mutandis to a method that is executed by a system and/or a system that is configured to execute the instructions stored in the non-transitory computer readable medium.

Any reference to a "solution" should be applied mutatis mutandis, to a method, system, and a non-transitory computer readable medium as illustrated below.

The term "and/or" is additionally or alternatively.

In the following description and related drawings there may be provided various numerical examples (for example eight pods, five first tier switches per pod, four second tier switches per pod, four third tier switches, five third tier switches per third tier switch)—but any other numbers may be provided.

The terms "buffer" and "queue" are used in an interchangeable manner.

The terms "system", "unit", "device" are used in an interchangeable manner.

Buffer extension queues are queues that provide buffer extension to another buffer. They are also referred to as virtual queues.

The terms "first tier" and "leaf" are used in an interchangeable manner.

The terms "second tier" and "spline" are used in an interchangeable manner.

The term "substantially" may mean at least a majority of—for example—above 80% or above 90%.

There may be provided a modular switch that includes multiple switching elements that are arranged in multiple tiers—for example in a first tier (T1) and a second tier (T2). The T1 switching elements include input output (IO) ports for receiving traffic with other and/or sending traffic to the other devices.

The modular switch is a scale-out modular switch in the sense that it includes multiple switching element and acts as single larger virtual switching element having a throughput that exceeds the throughput of a single switching element.

The modular switch has a non-blocking configuration. For example—the T2 switching elements are coupled to the T1 switching elements in a non-blocking manner.

The T1 switching elements are configured to perform traffic management and substantially all of the egress processing and ingress processing.

The modular switch may also have a an oversubscription topology.

The traffic management may include load balancing, traffic shaping and flow-based reordering.

The ingress processing may include format changes, encapsulating, header tunneling, header removal. decapsulation, and determining a T2 queue (that may have different instances in the different T2 switching elements) that should store the traffic element, and the like.

The ingress processing may include format changes such as encapsulation, and the like. The format changes may be required in order to comply with a format acceptable by a target device.

The T2 switching elements are configured to (a) provide a shared memory space to the T1 switching elements, (b) perform substantially all of the queuing and scheduling of traffic and (c) send, to the T1 switching elements, status information related to the status of shared memory resources.

The load balancing and/or the traffic shaping may be based, at least in part, on the status of the shared memory resources.

The load balancing and/or traffic shaping may also be responsive to at least one of:
 a. The priority of a traffic element.
 b. A ingress IO port (IO port of a T1 switching element that received the traffic element).
 c. A switching element that included the ingress IO port.
 d. An egress IO port (IO port of T1 switching element that is scheduled to output the traffic element outside the modular switch).
 e. A switching entity that included the egress IO port.

f A destination device.

g. A target device.

h. A load on one or more links that couple the T1 switching elements to the T2 switching elements, and the like.

The reordering of traffic elements and the scheduling of an output of the traffic elements (through the IO ports of the switching elements—outside the modular switch) may be based on an identity of a flow associated with the traffic elements.

The reordering and the scheduling of the output of the traffic elements may include reducing an occurrence of inter-flow related head of a line blocking. This may reduce the chances that problems related to traffic of a certain flow will be stuck because of traffic of another flow.

The allocation of tasks between the T1 switching elements and the T2 switching elements is highly effective and reduces the processing resources related to the packets while the queuing and scheduling are executed mostly by the T2 switching elements. For example—without the partition— each switching element in the path of the packet (for example—T1 source switching element, T2 switching element and T1 destination switching element) would perform ingress processing, egress processing—which may double and even triple the processing performed on each packet— and also increase latency.

In one example the egress processing, the traffic shaping, and the ingress processing of a traffic element may be executed by an ingress T1 switching element—before the ingress T1 switching element sends the traffic element to the second tier switching elements.

In yet another example—the ingress processing, traffic shaping and load balancing are executed by an ingress T1 switching element and the flow based reordering and the egress processing is executed by the egress T1 switching element—after the egress switching element receives the traffic element from a T2 switching element. The egress T1 switching element may also perform traffic shaping.

The traffic shaping may be, for example, active queue management (AQM)— or any other traffic shaping process.

Performing the traffic shaping by the ingress T1 switching element saves modular switch resources—especially when stopping a traffic element—thereby saving spending further modular switch results on a traffic element that is ignored of.

The T2 switching elements provide most of the queuing resources—but the queuing is based on queuing information indicative of queuing decisions that are made by the T1 switching element.

The outcome of the ingress processing and the traffic management may involve generating queuing information that indicates where (in which queue) to queue the traffic element.

The ingress processing may point to a certain T2 queue that has different instances in the different T2 switching elements—and the load balancing may determine to which instance of that certain T2 queue to send the traffic element and over which link.

The T2 switching elements may apply any queue management scheme (fairness based or any other control scheme) for determining when and how to dequeue traffic elements from the T2 queues.

The T1 switching elements may include an insignificant amount of storage resources for storing the traffic elements (for example—may have few shallow queues for storing a small amount of traffic elements—for example between two and eight traffic elements) during the ingress and/or egress processing.

Because substantially all of the queueing is done in the T2 switching element—the memory resources of the T1 switching elements may be used to store more extensive forwarding and routing tables to support larger networks. In addition, larger visibility and debuggability may be achieved by using larger flow tables (see IPFIX: https://en.wikipedia.org/wiki/IP Flow Information Export) and statistics counters. The switching elements may store all the required metadata—without requiring external memory modules.

FIG. 1 illustrates an example of modular switch 500.

Modular switch 500 includes (a) first, second, third and fourth T1 switching elements 510, 520, 530, and 540, respectively, (b) first and second T2 switching elements 560 and 570, respectively, (c) internal links 581, 582, 583, 584, 585, 586, 586, 587 and 588 for connecting each T1 switching element to each T2 switching element, and (d) external links 591, 592, 592 and 594 for connecting the modular switch 500 to other devices.

It is assumed that the throughput of modular switch 500 is 2B (B being a positive integer), that the throughput of each external link is B/2 and that the throughput of each internal link is B/4.

Modular switch 500 is non-blocking because each T1 switching element is connected to each T2 switching element, each T1 switching element uses at least half of its bandwidth to connect to the T2 switching element, the total bandwidth of the T2 switching elements (being four times B/2) is at least the aggregated bandwidth of the IO ports and external links (being four times B/2), and there is an effective (not limited to perfect) load balancing between T1 and T2 switching elements.

The modular switch 500 is configured to receive traffic elements such as packets that are aimed to a destination device coupled to the modular switch, process (by T1 switching elements) the packets so their path within the modular switch is known and then queue the packets in the T2 switching elements.

In FIG. 1, T1 switching elements 510, 520, 530, 540 are illustrated as including (a) interfaces such as IO ports 511, 521, 531 and 541 respectively, (b) processors such as 512, 522, 532 and 542, and (c) memory 513, 523, 533 and 543 respectively.

In FIG. 1, T2 switching elements 560 and 570 are illustrated as including (a) interfaces 561 and 571 respectively, (b) processors such as 562 and 572, and (c) memory 563 and 573, respectively.

The functionality of components (processor, memory, interface) may differ between the components of the T1 switching elements and the components of the T2 switching elements.

Figure 2:
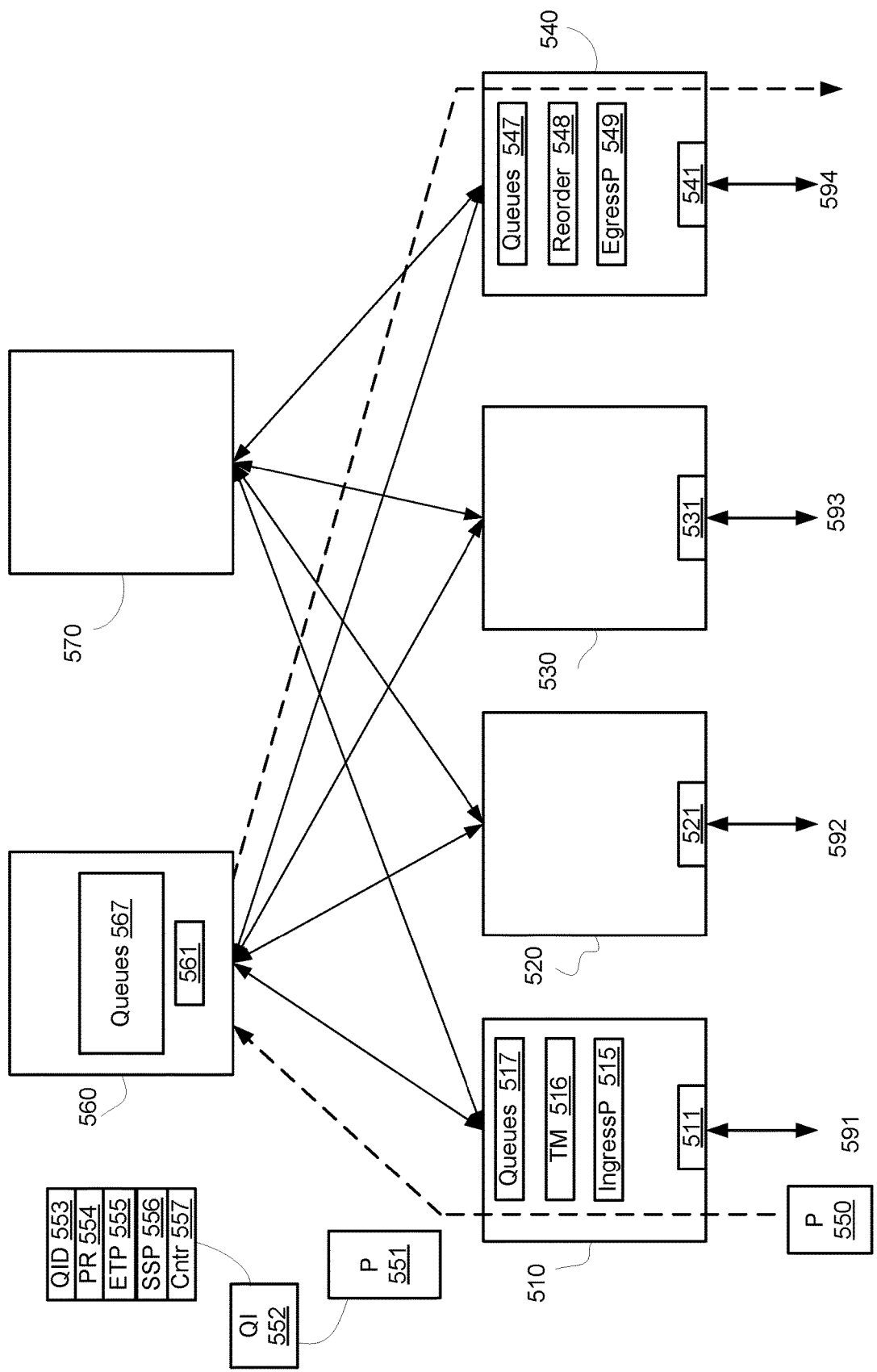
FIG. 2 is an example of a flow of a packet through the modular switch.

FIG. 2 illustrates a flow of a packet such as packet P 550 through the modular switch 500.

Packet 550 is received by T1 switching element 510 and is aimed to a destination device that is coupled to T1 switching element 540. T1 switching element 510 performs various operations such as ingress processing 515, traffic shaping and load balancing 516 and briefly stores the packet at its shallow queues 517.

The queuing information QI 552 is added to packet 550 to form amended packet 551. The queuing information may include, for example, at least one of T2 queue identifier (QID 553), queue priority 554, egress target port 555, source port 556 and additional control metadata (557). Control metadata may, for example indicate if egress processing is required, if T2 switching elements need to perform processing, and the like.

Amended packet 551 is received by interface 561 of T2 switching element 560, queuing information is processed to determine (at least) the relevant T2 queue, and is queued the relevant T2 queue out of queues 567 (identified by T2 queue identifier), until it is dequeued and sent to T1 switching element 540. T1 switching element 540 briefly queues (547) the amended packet, may preform flow based reordering (548), may perform egress processing (549), and outputs the packet 550 to its destination via egress IO port 541.

Figure 3:
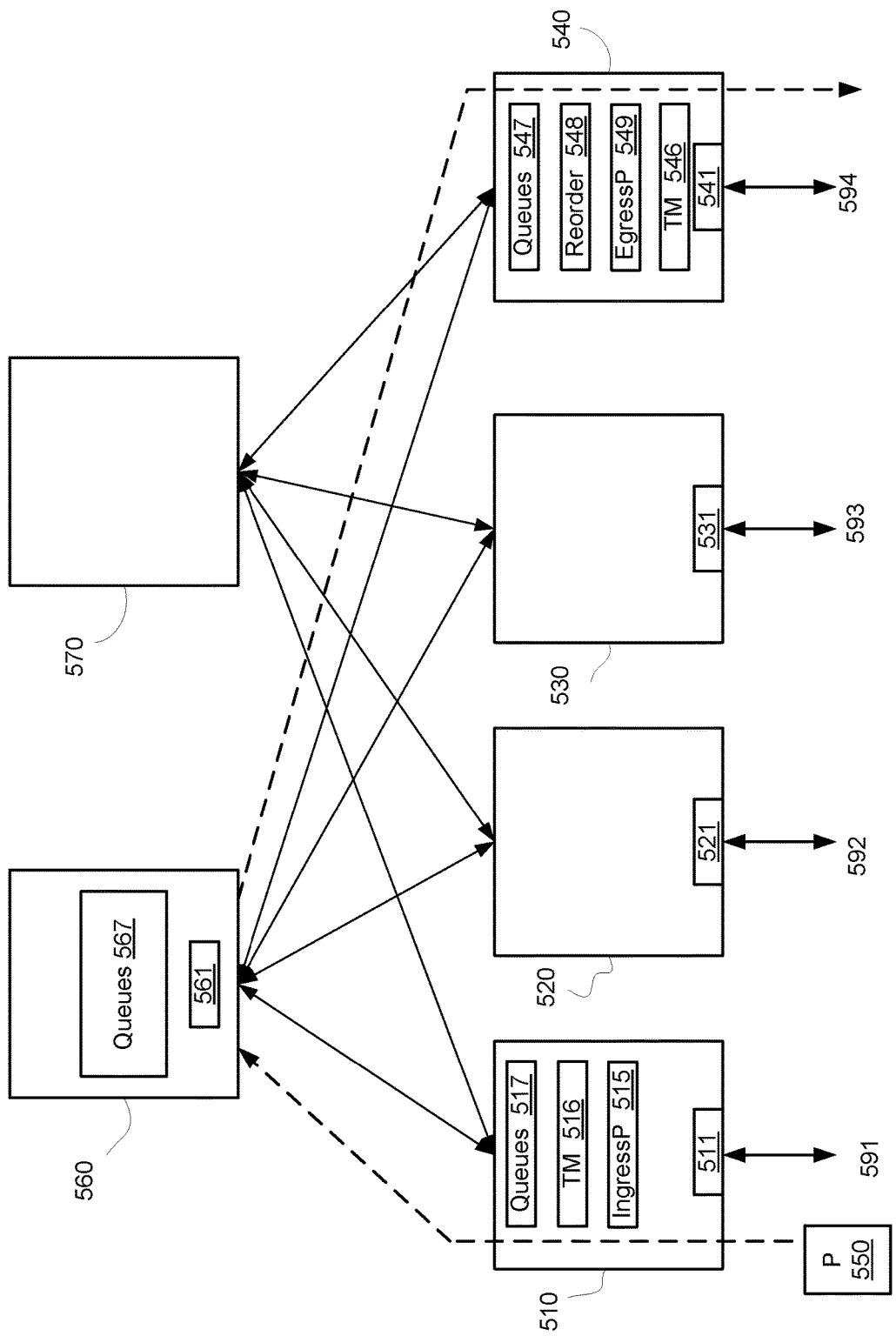
FIG. 3 is an example of a flow of a packet through the modular switch.

FIG. 3 illustrates a flow of a packet P550 through the modular switch 500. The flow of FIG. 3 differs from the flow of FIG. 2 by performing the traffic shaping (egress traffic shaping) by T1 switching element 540 (546) and not just by T1 switching element 510 (which performs ingress traffic shaping).

Figure 4:
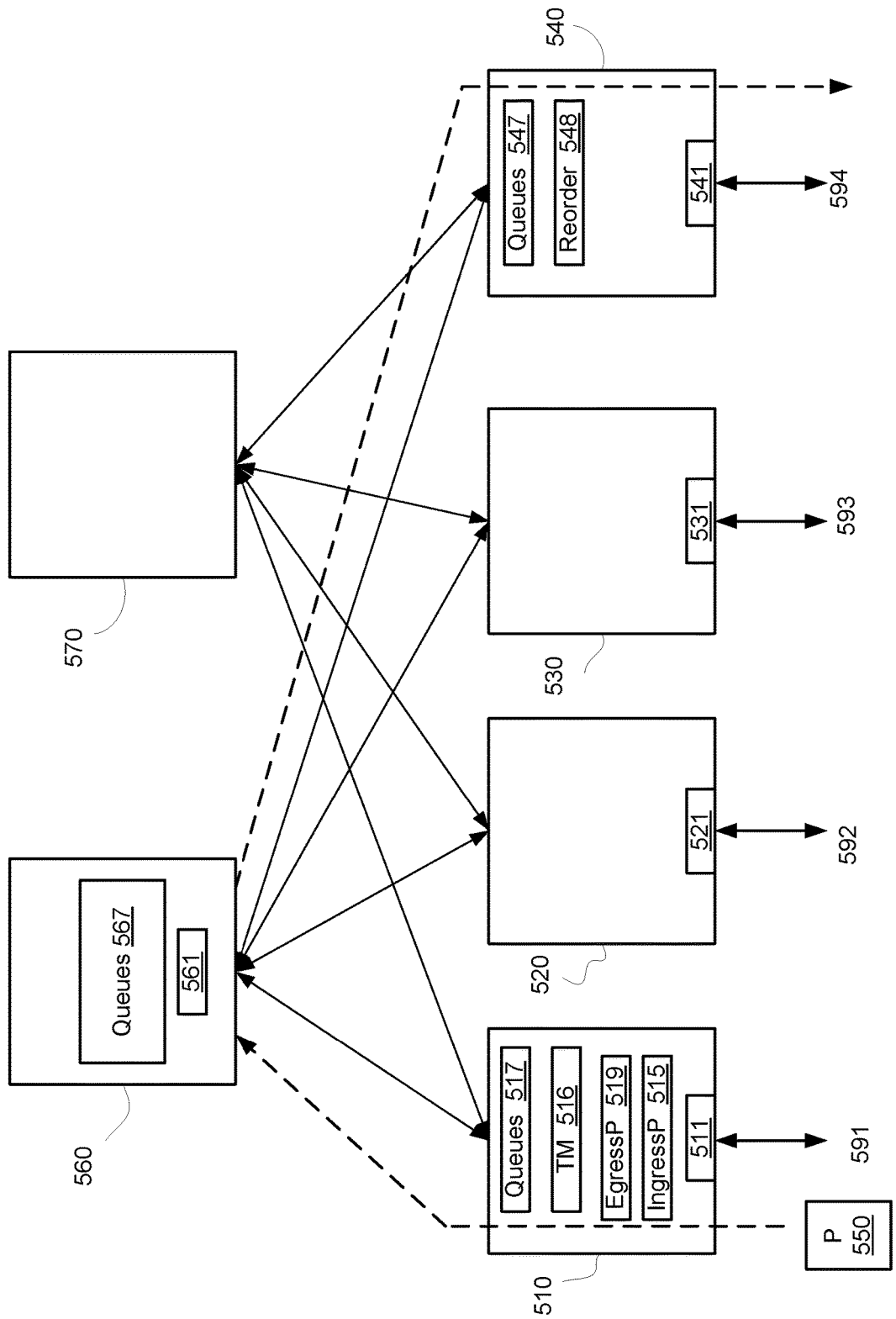
FIG. 4 is an example of a flow of a packet through the modular switch.

FIG. 4 illustrates a flow of a packet P 550 through the modular switch 500. The flow of FIG. 4 differs from the flow of FIG. 2 by performing both the ingress processing (515) and the egress processing (519) by T1 switching element 510.

The modular switch 500 may address various issues related to the data plane scaling:

a. Throughput—provide a maximum number of bits per second (bps) and process a maximal number of packets per second (pps). Scaling the throughput means that the modular switch can forward more traffic that a single switching element.

b. Control table size—the maximum size of the tables the data plane uses to take (among other tasks) security and forwarding decisions. Usually, these tables are configured by the control plane as a result of, for example, convergence of the routing protocol. Scaling control tables means that the modular switch can forward traffic to more destinations or hold security filters for more users. The T1 switching elements may store these data tables- and even allocate substantial memory resources as they allocate minimal resources for storing the packets.

c. Packet Storage (packet buffer) size: maximum size of packets that can be stored, measured in Bytes (B) or bits (b). Scaling the size of the packet buffer means that the modular switch can efficiently cope with a wider variety of workloads while delivering the same expected performance. Here, "performance" is average task completion time, where a task is an application that requires transferring information over the network. For example, a task might be file transfer (e.g. photo sharing). A network modular switch with shallow buffer may suffer higher packet drop rates than a switch with deep buffers. Every dropped packet has to retransmitted—an action that increases the task completion time. The T2 switching elements of modular switch 500 provide a shared memory space (shared buffer) of significant size—as almost all the memory resources of the T2 switching elements are allocated to queuing packets.

The shared buffer provided by the T2 switching elements has better performance and less bottleneck than "segmented buffers"—that shared only the memory of a single T2 switching element—therefore—a segmented buffer solution directs all packets of a certain flow to a single queue of a single switching element.

The shared buffers provided by the T2 switching elements has several advantages over partitioned buffers with same size:

a. Lower probability for packet discard due to congestion.

b. Simpler management of the buffer store by configuration of the AQM engine. Partitioned buffers typically require configuring AQM per partition, while in shared buffers architecture there is only one "partition" and one AQM engine to configure.

c. Shared buffers have more predictable operation. For example, if the flows shown in FIG. 3 are high-priority and in there is an additional low priority flow passing via Spine-0 to Leaf-0 (low priority flow is not shown), then the high priority flows will suffer packet discard before the low priority—an undesired result that is completely eliminated with shared buffers.

The support, by the modular switch 500, of the shared buffer requires efficient (even perfect) load balancing, so each flow evenly consumes storage resources in all devices. The dynamic load balancer requires a re-ordering of the packets at the destination T1 switching element—as the load balancing and every transmission in the networks switch (from T1 switching elements T2 switching elements, and the like) may introduce a disorder.

Spray and Reorder

Spraying refers to the load balancing process that may send different packets of a same flow to different T2 switching elements.

Spraying and reordering of packets within the modular switch may dramatically improve the effective buffer that a single flow can use. The load balancing may include sending each packet within a flow to a least occupied T2 switching element in order to try balancing the capacity across all T2 switching elements. The spraying put some major challenges on the egress device since it responsible for maintaining to original packet order per flow—under challenging constraints such as a. A low end-to-end (for the overall passage within the modular switch 500) latency—for example below 1 microsecond.

b. Limited reordering resources at the egress switching element.

c. Overcome skews of many sources. For examples— skews within T1 switching element, skews between different switching elements, and skews between T2 switching elements.

Coarse Reordering

A Naïve approach for reordering may define an ordering domain per source device per target port within egress device and per queue followed by a sequence number generator per ordering domain (note that larger number of ordering domains e.g. flow based is not feasible since it requires too many hardware resources). The ingress device assigns a sequence number for the incoming packet according to its ordering domain while the egress device track the incoming sequence numbers and transmit packet with sequence number N right after packet with sequence number N−1. This scheme creates head-of-the-line blocking between one flow to another which increases the latency and the amount of memory consumed by the reorder buffer. This may lead to significant degradation in latency and performance compares to standard ECMP based flow under multiple switching devices.

Flow-Based Reordering

In order to improve the efficiency of the T1 switching element reordering there may be provided a flow filter that may be configured to reduce the head-of-the-line blocking and allows to make progress on other flows while waiting for a specific packet on a different flow.

Figure 5:
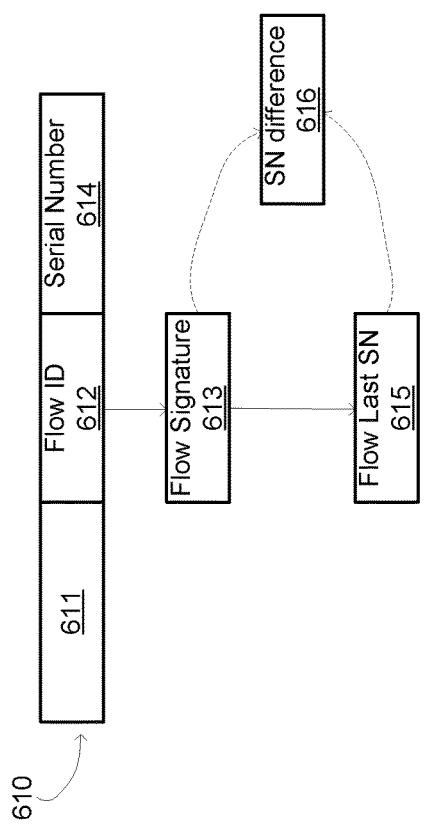
FIG. 5 is an example of reordering.

FIG. 5 illustrates an example of the flow-based reordering. The flow may include using a flow filter—that may be a hash based filter that gets the Flow ID (612), typically 5-tuples (source IP address/port number, destination IP address/port number and the protocol in use) and the ordering domain and hash it to a flow signature (613).

This signature serves as an address to a filter memory that stores a last sequence number (flow last SN 615) that was used for this flow.

The last sequence number (615) may then subtracted from the packet sequence number (serial number 614) to form a serial number difference (616)—also referred to as a blocking sequence number.

This blocking sequence number can be seen as dependency length from the current sequence number. For example, assuming a packet sequence number of 98 and a last filter sequence number of 90 leads to a blocking sequence number of 8 which means that packet 98 has a dependency in a packet that is in 8 places distance.

FIG. 6 illustrates an example of a sequence of packets that belong to certain flows (flow 2 and 3) that would not be blocked due to missing packets of flow 1.

Traffic Shaping

The T1 switching elements may apply the AQM to decide whether a received packet should be discarded or stored based on the congestion level of the queues of the T2 switching elements.

The AQM has to balance conflicting objectives. For example, on one hand AQM should minimize packet drops—an objective that encourage storing every packet until the packet memory overflows. On the other hand, AQM should guarantee fairness among competing flows—an objective that calls for reserving buffers to flows. The T1 switching element may apply any tradeoff between these conflicting objectives.

The AQM may abstract the distributed storage resources of the T2 switching elements as one unified storage (shared buffer).

The AQM may be responsive to attributes such as:

The AQM or any other traffic shaping process may also be responsive to at least one of:
  a. The priority of a packet.
  b. The status of the resources of the shared buffer—especially the one or more queues that may be used for queuing the packet. For example—if there are two instances of a queue (one in each T2 switching element) that may receive the packet—then aggregate fullness level of both queues may be taken into account.
  c. Traffic parameter (for example amount of traffic per a certain time period) related to traffic from an ingress IO port.
  d. Traffic parameter related to traffic from a group of ingress IO ports.
  e. Traffic parameter related to traffic from an ingress switching element.
  f Traffic parameter related to traffic destined to an egress IO port.
  g. Traffic parameter related to traffic destined to a group of egress IO ports.
  h. Traffic parameter related to traffic destined to a egress switching element.
  i. Traffic parameter related to traffic destined to a target device.
  j. Traffic parameter related to traffic from a destination device.

For example—the traffic shaping may apply a fairness based process of queue, port, switching element, priority, target device and/or switching device basis.

The traffic shaping process may be fixed or dynamic. For example fixed and/ro dynamic thresholds may be applied to determine quotes of allowable traffic or determine a probability of blocking traffic.

The AQM process is executed by T1 switching elements—but is responsive to the status information related to the status of shared memory resources. For example—assuming that a packet is destined to queue 17 and that there are two switching elements—each includes queue 17. The AQM process may decide to discard a packet or to pass it to one of queues 17 (the selection of which one is made by a load balancing process)—based on the status of the two queues 17.

The AQM may be an adaptive AQM such as but not limited to blue, stochastic fair blue, resilient stochastic fair blue, adaptive early random detection (ARED), and Proportional Integral (PI) AQM (see—the definition of AQM in www.wikipedia.org).

Figure 7:
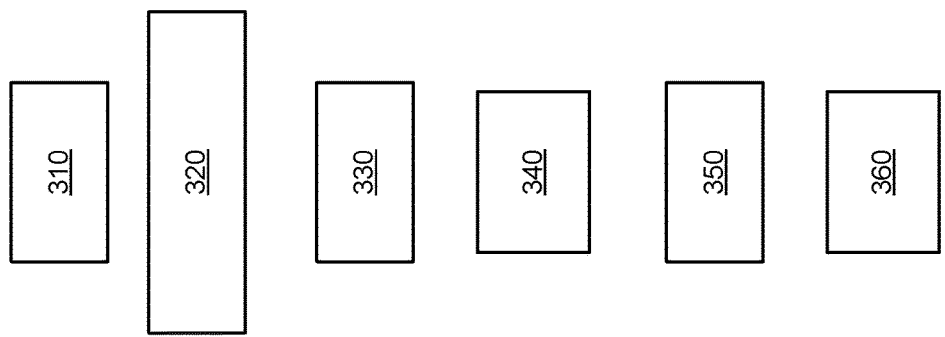
FIG. 7 is an example of a method.

FIG. 7 illustrates method 300.

Method 300 may include:

Step 310 of receiving traffic by a modular switch that comprises first tier switching elements that comprise input output (IO) ports, second tier switching elements that are coupled to the first tier switching elements in a non-blocking manner.

Step 320 of performing, by the first tier switching elements traffic management of traffic. The traffic management may include load balancing, traffic shaping and flow-based reordering.

Step 330 of preforming, by the first tier (T1) switches, substantially all egress processing and ingress processing of the traffic.

Step 340 of providing, by the second tier (T2) switching elements, a shared memory space to the first tier switching elements.

Step 350 of performing by the second tier switching elements, substantially all of the queuing of traffic.

Step 360 of sending to the first tier switching elements, status information related to the status of shared memory resources.

Step 320 of performing of the traffic management is based, at least in part, on the status information.

There may be provide a method that may include:
  a. Receiving a traffic element (such as a packet) by a modular switch that comprises first tier switching elements that comprise input output (IO) ports, second tier switching elements that are coupled to the first tier switching elements in a non-blocking manner.
  b. Performing by an ingress T1 switching element of the modular switch substantially all egress processing on the packet.
  c. Performing by the ingress T1 switching element load balancing and traffic shaping to determine a Q2 queue.
  d. Performing, by a T2 switching element that include the Q2 queue, substantially all of the queuing of the packet. Short term queuing can be done in the T1 switching elements.
  e. Dequeuing the packet and sending the packet to an egress T1 switching element.
  f. Performing flow based reordering and substantially all egress processing by the egress T1 switching element.
  g. Outputting the packet from the egress T1 switching element.

The method may also include performing traffic shaping on the packet by the egress T1 switching element.

There may be provide a method that may include:

a. Receiving a traffic element (such as a packet) by a modular switch that comprises first tier switching elements that comprise input output (IO) ports, second tier switching elements that are coupled to the first tier switching elements in a non-blocking manner.

b. Performing by an ingress T1 switching element of the modular switch substantially all egress processing on the packet and substantially all the egress processing of the packet.

c. Performing by the ingress T1 switching element load balancing and traffic shaping to determine a Q2 queue.

d. Performing, by a T2 switching element that include the Q2 queue, substantially all of the queuing of the packet. Short term queuing can be done in the T1 switching elements.

e. Dequeuing the packet and sending the packet to an egress T1 switching element.

f. Performing flow based reordering by the egress T1 switching element.

g. Outputting the packet from the egress T1 switching element.

In the foregoing specification, the invention has been described with reference to specific examples of embodiments of the invention. It will, however, be evident that various modifications and changes may be made therein without departing from the broader spirit and scope of the invention as set forth in the appended claims.

For example—a switching element (of the T1 and/or T2 tier) may be a high-end monolithic element which includes the following: (A) 256 ports of 100GE which sum up to 25.6T switch, (B) Thousands of internal processing elements targeting 40 billion packets per second, (C) Massive queueing system which supports up to 64K queues, (D) Internal memory of 128 MB which used for packet buffer, queuing system (especially in T2), lookup tables and counters (especially in T2).

Based on this switching element one can build a scale-out switch of 200T using minimum of 16 T1 devices and 8 T2 devices.

In an example—the modular switch may have a throughput of 200T-2000 ports of 1000 G each towards the ports, each T1 switching element may include 128 ports of 100GE each. Each T1 switching element may be connected to each T2 T1 switching element via one or more links having an overall throughput of 1.6T.

For an example of a modular switch of 200T it should be noted that:

The T2 switching element overall queue space is 1 GB.

In case where more queueing space more T2 switching elements can be add (for example—eight more T2 switching elements)—especially when there are redundant links from T1 switching elements to wards T2 switching element. In case of 16 T2 switching elements each T1 switching element may be e connected to T2 switching element with 2×400GE links and the total packet buffer will become 2 GB.

Since there is virtually no processing on T2 switching element the performance requirement is significantly reduced and hence the frequency can be scale down resulting in reduced power consumption (may be beneficial in data centers).

In case where more processing power is required one can add more T1 switching elements (no need to connect all the T1 switching elements IO ports towards the servers).

The end-to-end latency is reduced compared to non-scale out system since spine switches doesn't do any processing Use of Internal Memory to Implement Forwarding Table.

The forwarding table serves as a major data structure that stored in a router and used to identified the next hop in the routing path towards the required destination.

The ever increasing number of routed devices put a major challenge to a switching element which has a limited internal RAM and need to store the routing information for large scale of devices.

There are many heuristics and algorithms that tries to address this challenge but and the end of the day they limited by the actual physical memory that exists within the device.

In order to demonstrate this lets take the switching element that was described above in two modes:

(a) A standalone monolithic switch where 32 MB out of the 128 MB are used for tables, and (b) A scaleable system where T1 switching element has 96 MB out the 128 MB for forwarding table.

A typical implementation of forwarding table for IPv4 will use 8B-16B for each forwarding entry, 30% additional entries that used as a metadata to accelerate performance and corresponding result table.

Based on this settings—option (a) may achieve a forwarding table of ~400K entries while option (a) may achieve more than 1M entries. This gap is very significant since it defines the target use cases of the switch.

A large hyperscale cloud vendor core switch for example may require more than 1M entries where a small data center TOR (top of rack) switch may require less than 100K entries.

Note that this become even more critical due to the move to ipv6 which implements address space of 16B instead of 4B as in IPv4.

This means that the forwarding entry increase and as a result the number of entries decrease.

The T1 switching elements may store all data required for ingress processing and egress processing—and may not require external memories—that increase latency.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a system as including a certain component should also cover the scenario in which the system does not include the certain component. For example—any reference to a method as including a certain step should also cover the scenario in which the method does not include the certain component. Yet for another example—any reference to a system that is configured to perform a certain operation should also cover the scenario in which the system is not configured to perform the certain operation.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit that is illustrated in any of the figures and/or specification and/or the claims may be provided.

Any combination of steps, operations and/or methods illustrated in any of the figures and/or specification and/or the claims may be provided.

We claim:

1. A modular switch, comprising:
   first tier switching elements that comprise input output (IO) ports; and
   second tier switching elements that are coupled to the first tier switching elements in a non-blocking manner;
   wherein the first tier switching elements are configured to perform traffic management of traffic, and perform substantially all egress processing and ingress processing of the traffic; wherein the traffic management comprises load balancing, traffic shaping and flow-based reordering;
   wherein the second tier switching elements are configured to (a) provide a shared memory space to the first tier switching elements, (b) perform substantially all of the queuing of traffic and (c) send, to the first tier switching elements, status information related to the status of shared memory resources; and
   wherein the first tier switching elements are configured to perform the traffic management based, at least in part, on the status information.

2. The modular switch according to claim 1 wherein flow based reordering comprises reducing an occurrence of inter-flow related head of a line blocking.

3. The modular switch according to claim 1, wherein the first tier switching elements are configured to perform egress processing that is related to a traffic element before sending the traffic element to the second tier switching elements.

4. The modular switch according to claim 1, wherein the first tier switching elements are configured to perform egress processing that is related to a traffic element after receiving the traffic element from the second tier switching elements.

5. The modular switch according to claim 1, wherein the traffic shaping comprises active queue management (AQM).

6. The modular switch according to claim 1, wherein the first tier switching elements are configured to send to the second tier switching elements queuing information indicative of the queuing decisions.

7. The modular switch according to claim 1 wherein the first tier switching elements are configured to perform port based load balancing and switching element based load balancing.

8. A method, comprising
   receiving traffic by a modular switch that comprises first tier switching elements that comprise input output (IO) ports, second tier switching elements that are coupled to the first tier switching elements in a non-blocking manner;
   performing, by the first tier switching elements, traffic management of traffic;
   preforming, by the first tier switches, substantially all egress processing and ingress processing of the traffic; wherein the traffic management comprises load balancing, traffic shaping and flow-based reordering;
   providing, by the second tier switching elements, a shared memory space to the first tier switching elements;
   performing by the second tier switching elements, substantially all of the queuing of traffic;
   sending to the first tier switching elements, status information related to the status of shared memory resources; and
   wherein the performing of the traffic management is based, at least in part, on the status information.

9. The method according to claim 8 wherein flow based reordering comprises reducing an occurrence of inter-flow related head of a line blocking.

10. The method according to claim 8 comprising performing, by the first tier switching elements, egress processing that is related to a traffic element before sending the traffic element to the second tier switching elements.

11. The method according to claim 8 comprising performing, by the first tier switching elements, egress processing that is related to a traffic element after receiving the traffic element from the second tier switching elements.

12. The method according to claim 8 wherein the traffic shaping comprises active queue management (AQM).

13. The method according to claim 8 comprising sending, by the first tier switching elements, and to the second tier switching elements, queuing information indicative of the queuing decisions.

14. The method according to claim 8 comprising performing, by the first tier switching elements, port based load balancing and switching element based load balancing.

15. A method, comprising
   receiving a traffic element by an ingress first tier switching element of a modular switch that comprises first tier switching elements that comprise input output (IO) ports, second tier switching elements that are coupled to the first tier switching elements in a non-blocking manner;
   performing, by the ingress first tier switching element, substantially all egress processing of the traffic element;
   performing, by the ingress first tier switching element, traffic management of the traffic element; wherein the traffic management comprises load balancing, and traffic shaping; wherein the traffic management is based, at least in part, on the status information of shared memory resources provided by the second tier switching elements;
   sending the traffic element and queuing information related to the traffic element to a second tier switching element, when the traffic shaping allows sending the traffic element to the second tier switching element;
   queuing the traffic element in a queue of the second tier switching element; wherein the queuing is responsive to the queuing information;
   dequeuing the traffic element from the queue of the second tier switching element;
   sending the traffic element to an egress first tier switching element;
   performing, by the egress first tier switching element, flow-based reordering;
   performing egress processing by at least one of the egress first tier switching element and the ingress first tier switching element; and
   outputting the traffic element from the modular switch.

* * * * *